United States Patent [19]

Shioka et al.

[11] Patent Number: 5,257,262
[45] Date of Patent: Oct. 26, 1993

[54] DCME UNIT CAPABLE OF PROCESSING A WIDE VARIETY OF INPUT INFORMATION SIGNALS

[75] Inventors: Masashi Shioka; Seiichiro Shigaki, both of Tokyo, Japan

[73] Assignee: NEC Corporation, Tokyo, Japan

[21] Appl. No.: 658,895

[22] Filed: Feb. 22, 1991

[30] Foreign Application Priority Data

Feb. 22, 1990 [JP] Japan .................................... 2-39752

[51] Int. Cl.[5] ............................................. H04J 3/02
[52] U.S. Cl. ........................................ 370/112; 370/53; 370/58.1; 370/79; 370/84; 370/85.6
[58] Field of Search ............... 370/112, 58.1, 53, 94.1, 370/95.1, 85.7, 79, 85.6, 84

[56] References Cited

U.S. PATENT DOCUMENTS

| | | | |
|---|---|---|---|
| 4,045,616 | 8/1977 | Sloane | 381/37 |
| 4,993,022 | 2/1991 | Konda et al. | 370/79 |
| 5,005,170 | 4/1991 | Nelson | 370/112 X |
| 5,132,966 | 7/1992 | Hayano et al. | 370/94.1 |

OTHER PUBLICATIONS

Aranguren et al., "A Digital Time Division Switching Arrangement", PCT Application No.: PCT/US78/00001, Jun. 1, 1978.

Fourth International Conference on Digital Satellite Communications, Oct. 23–25, 1978, pp. 261–268.

*Primary Examiner*—Douglas W. Olms
*Assistant Examiner*—Russell W. Blum
*Attorney, Agent, or Firm*—Sughrue, Mion, Zinn, Macpeak & Seas

[57] ABSTRACT

In a DCME unit for use in assigning each of input digital signals arranged in each of input channels to a plurality of output channels in which output digital signals are arranged, respectively, a degree of priority is given to an assignment request in dependency upon a sequential order, a request species, and an input channel number. Each assignment request is successively selected from a higher degree of priority by a memorization control section to determine a bit rate to be encoded. Each input digital signal is encoded into an encoded digital signal by an encoder in accordance with the bit rate. The encoded digital signal is arranged into a selected one of the output channel by a high speed switching circuit to be sent to a transmission line together with an encoded assignment signal related to the request species and the input channel number. Flags may be used to draw out useless input channel numbers with the sequential order kept unchanged and to avoid double registration of the input channel numbers.

11 Claims, 7 Drawing Sheets

DCME UNIT CAPABLE OF PROCESSING A WIDE VARIETY OF INPUT INFORMATION SIGNALS

BACKGROUND OF THE INVENTION

This invention relates to a digital circuit multiplexing equipment (DCME) device for use in assigning a plurality of input digital signals arranged in a plurality of input channels to a plurality of output channels, such as satellite channels, interexchange channels, or the like.

In general, telephone communication is carried out with a communication or telephone line occupied during the telephone communication. In this event, it is known in the art that an occupied time interval of the telephone line is longer than a time interval during which speech or voice energy is actually present in the telephone line and which may be called a speech time interval and that a ratio of the speech interval to the occupied time interval will be referred to as a speech activity. Practically, the speech activity is less than 40%, as well known in the art. This shows that any other speech communication may be assigned to or interpolated in the remaining time interval except the speech interval in a digital fashion. In this connection, the above-mentioned technique will be called a digital speech interpolation (DSI) technique. According to the digital speech interpolation technique, effective transmission can be carried out only during each speech interval alone.

Herein, inasmuch as each input speech signal is arranged within each of input communication channels in a digital fashion in the telephone communication and is assigned to each of output communication channels, the input speech signals can be transmitted through the number of the output communication channels that is smaller than the number of the input communication channels when the digital speech interpolation technique is used. As a result, it is possible to effectively utilize the output communication channels by the use of the digital speech interpolation technique. Practically, such a digital speech interpolation technique is utilized in a satellite communication system.

In the meanwhile, consideration has been made about applying the digital speech interpolation technique to a digital circuit multiplexing equipment (DCME) unit. Herein, various sorts of input information signals should be effectively multiplexed by the DCME unit. For example, the input information signals may include a variable length code subjected to high efficiency speech encoding, such as adaptive differential pulse code modulation (ADPCM), and a data signal of a bit rate of 64 Kbit/s. Such use of a DCME unit is helpful for effectively increasing a transmission capacity. However, a large size of hardware is necessary for multiplexing various sorts of input information signals by the DCME unit.

SUMMARY OF THE INVENTION

It is an object of this invention to provide a digital circuit multiplexing equipment (DCME) unit which can be formed by a small size of hardware and which is therefore simple in structure.

It is another object of this invention to provide a digital circuit multiplexing equipment unit which is capable of processing a wide variety of input information signals at a high speed.

It is still another object of this invention to provide a digital circuit multiplexing equipment unit which is effectively applicable to a satellite communication system.

The invention involves a digital circuit multiplexing equipment unit which receives a plurality of input signals in a respective plurality of input channels, each input channel having an input channel number, and assigns the input signals to a plurality of output channels after being encoded at selected bit rates, said unit comprising:
  detecting means responsive to said input signals for detecting whether each of said input signals is present in its respective input channel, to thus produce a channel state signal;
  request producing means responsive to said channel state signal for producing assignment requests sequentially appearing with time, said assignment requests each indicating a respective degree of priority amongst the input signals;
  selecting means for selecting said assignment requests in the sequential order according to the respective degree of priority of said input signals;
  bit rate determining means responsive to the selected assignment requests for determining said bit rates to be used in said output channels; and
  multiplexing means for connecting the input signals to the output channels in accordance with the selected assignment requests selected by said selecting means;
  wherein each of said assignment requests includes the input channel number of the input channel in which the assignment request occurs, a time sequence of occurrence of the assignment request, and a request species indicative of the particular type of input signal corresponding to the assignment request;
  said selecting means comprising:
  priority deciding means for deciding the degree of priority on the basis of said request species and said time sequence of the occurrence of the assignment request; and
  selected request producing means for producing as said selected request, the input channel number and said request species.

DESCRIPTION OF THE PREFERRED EMBODIMENTS

Figure 1:
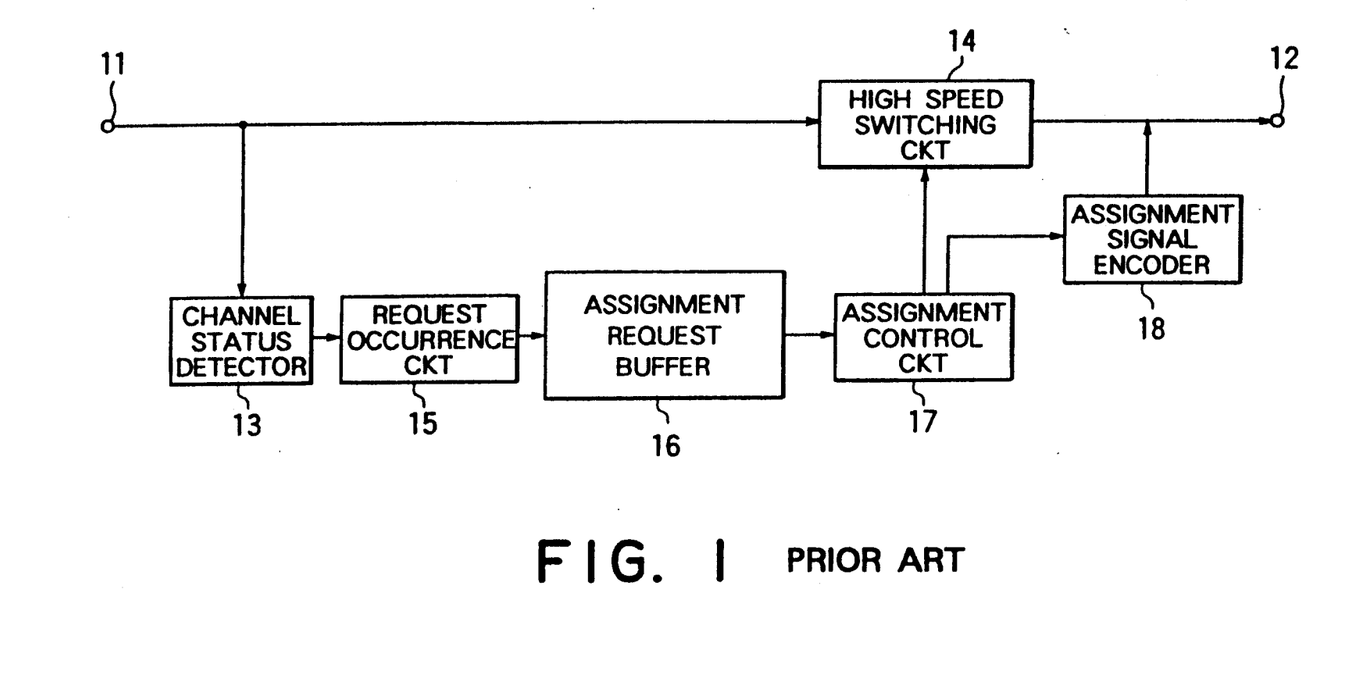
FIG. 1 is a block diagram of a conventional digital speech interpolation (DSI) device which uses a digital speech interpolation technique.

Referring to FIG. 1, description will be made as regards a conventional digital speech interpolation (DSI) device for a better understanding of this invention. The illustrated DSI device is assumed to be used in a satellite communication system and has an input terminal 11 and an output terminal 12. The input terminal 11 is supplied with a sequence of input digital signals which may be a sequence of PCM signals and which are arranged within input channels, respectively. Thus, the input digital signals are equal in number to the input channels and may be, for example, digital speech signals. At any rate, the input digital signals are sent to both a channel status detector 13 and a high speed switching circuit 14. The high speed switching circuit 14 is operable in a manner to be described later. The channel status detector 13 successively detects whether or not the input digital signals are present in the input channels by monitoring voice or speech energy. In other words, the channel status detector 13 detects each state of the input channels.

On detection of presence of the input digital signals, the channel status detector 13 successively supplies a request occurrence circuit 15 with a detection signal which is representative of each state of the input channels and which may be called a channel state signal. Responsive to the detection signal, the request occurrence circuit 15 successively generates a channel connection request which is successively sent to an assignment request buffer 16 and which is thereafter supplied to an assignment control circuit 17. Thus, the channel connection request is temporarily memorized in the assignment request buffer 16 before it is supplied to the assignment control circuit 17. This is because the channel connection requests might simultaneously appear in a lot of the input channels. In addition, an assignment channel is prepared in the output channels at every unit time interval of, for example, 2 milliseconds so as to specify a single connection relationship between the input and the output channels. In other words, such an assignment channel can appear only one time during each unit time interval. Therefore, ability to process the channel connection requests is restricted in the assignment control circuit 17. This results in necessity of the assignment request buffer 16.

In this event, it is assumed that the channel connection request is composed of a channel number and an occurrence order or a sequential order of the channel connection request. The channel number is indicative of an input channel in which the assignment request occurs and may be referred to as a request occurrence channel number. Under the circumstances, the assignment request buffer 16 is successively loaded as the channel connection request with both the channel number and the occurrence order. Thus, the channel numbers and the occurrence orders are memorized in the assignment request buffer 16 as memorized channel numbers and memorized occurrence orders. The illustrated assignment request buffer 16 is formed by a first-in first-out (FIFO) memory and successively produces the memorized channel numbers and the memorized occurrence orders from oldest ones of them. In other words, the oldest memorized channel number and the oldest memorized occurrence order have a highest degree of priority.

In the illustrated example, the oldest channel number is sent to the assignment control circuit 17 as a most preferential channel number specified by the highest degree of priority. The assignment control circuit 17 decides assignment of each output channel in response to each channel number to produce an assignment signal representative of the output channel to be assigned.

The assignment signal is delivered from the assignment control circuit 17 to both the high speed switching circuit 14 and an encoder 18. The high speed switching circuit 14 assigns the input digital signals to the output channels in response to the assignment signal. On the other hand, the assignment signal is encoded by the encoder 18 into an assignment code. As a result, the input digital signals are assigned to the output channels and are supplied together with the assignment codes through the output terminal 12 to a transmission line (not shown).

It is to be noted here that the assignment request buffer 16 memorizes only the channel number and the occurrence order as the channel connection request. When such a DSI technique is applied to a digital circuit multiplexing equipment unit which carries out assignment of a variable length code subjected to ADPCM encoding and assignment of data signals having a bit rate of 64 Kbits/s, the assignment request buffer 16 should have a large capacity for memorizing a wide variety of assignment requests. Alternatively, any other buffer memory or memories should be prepared for the respective assignment requests. In addition, the assignment control circuit 17 must judge which one of the assignment requests is to be preferentially processed. Accordingly, a processing time becomes long. This shows that the illustrated DSI device is not suitable for the DCME unit.

Figure 2:
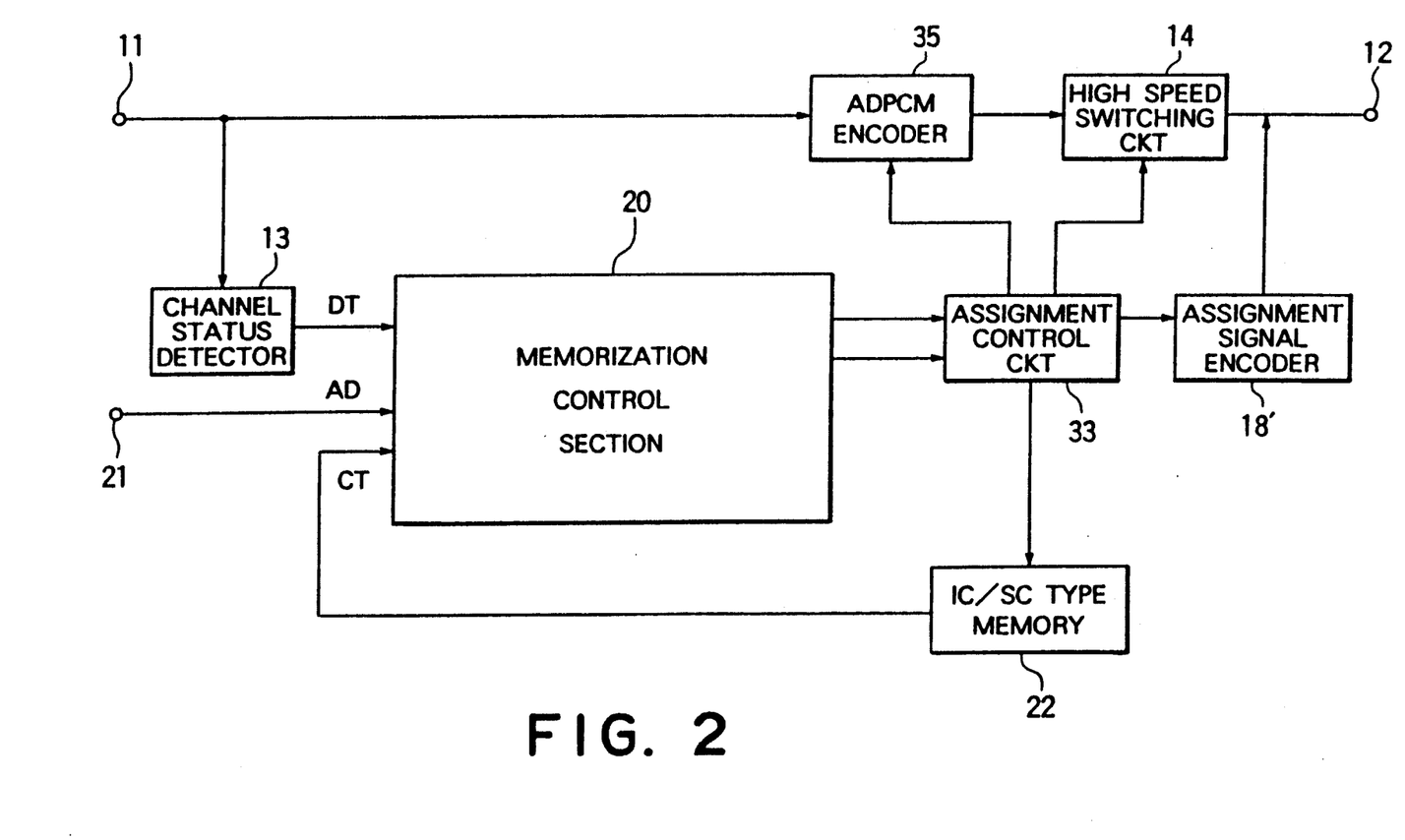
FIG. 2 is a block diagram for use in describing a digital circuit multiplexing equipment (DCME) unit according to each embodiment of this invention, wherein the DSI technique is used.
Figure 3:
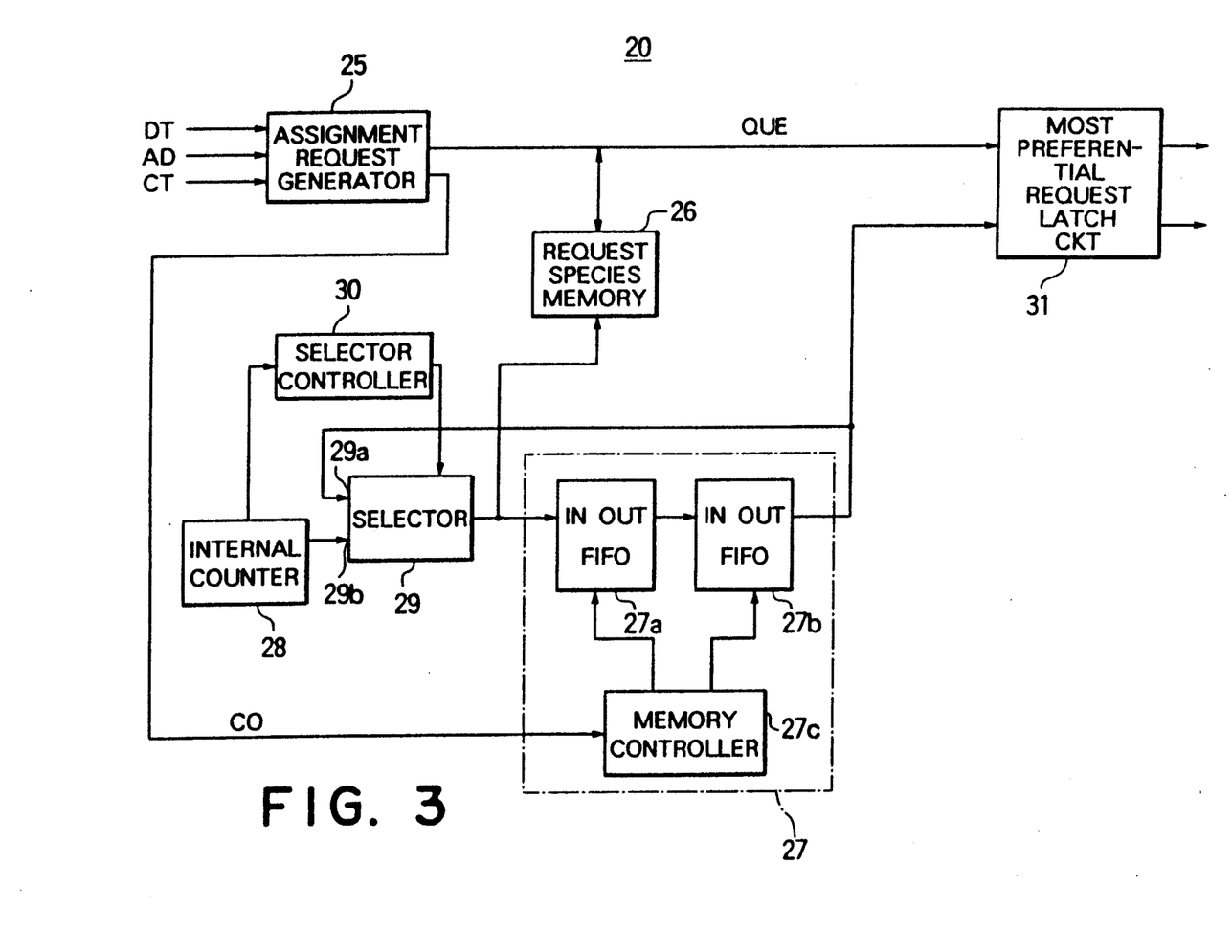
FIG. 3 is a block diagram of a part of the DCME unit according to the first embodiment according to this invention.

Referring to FIGS. 2 and 3, a digital circuit multiplexing equipment (DCME) unit according to a first embodiment of this invention is for use in a satellite communication system. Like in FIG. 2, the illustrated digital circuit multiplexing equipment unit has input and output terminals 11 and 12 for input digital signals and output digital signals, respectively. The input digital signals are arranged in input channels IC specified by input channel numbers of, for example, 256 while the output digital signals are arranged in output channels of, for example, 80 which may be called satellite channels SC in the example being illustrated.

Each of the input digital signals is given to the illustrated digital circuit multiplexing equipment unit at a predetermined bit rate which may be, for example, 64 Kbits/s. The input digital signals are formed by a voice signal, a voice band data signal, such as a facsimile signal, and a data signal of 64 Kbits/s and are produced in synchronism with the input channel numbers. In the example being illustrated, the voice signal and the voice band data signal are subjected to high efficiency encoding in the digital circuit multiplexing equipment unit and may be transmitted at different bit rates through the output channels. In addition, the data signal of 64 Kbits/s is sent through the illustrated unit without any encoding. Moreover, the digital speech interpolation (DSI) technique is also used in the digital circuit multiplexing equipment unit.

In this connection, the illustrated channel status detector 13 detects whether or not voice energy is present in each input channel and whether each input digital signal carries the voice signal or the voice band data signal. Such detection of the voice signal and the voice band data signal is possible in a manner known in the art. At any rate, the channel status detector 13 supplies a memorization control section 20 with a detection signal DT which is representative of a result of detection in the channel status detector 13. The detection signal DT is also representative of each state of the input channels and may be called a channel state signal.

The illustrated memorization control section 20 is supplied through an additional input terminal 21 with an additional request signal AD which is representative of connection or disconnection of a channel of 64 Kbits/s, namely, the input channel for the data signal of 64 Kbits/s. The additional request signal AD is produced by an exchange and is given through a signal processor (not shown) in synchronism with the input channel for the data signal. Herein, it is assumed that the additional request signal is composed of a single bit which takes a logic "1" level or a logic "0" level to specify the connection or the disconnection of the input channel, respectively. Stated otherwise, the logic "1" level and the logic "0" level of the additional request signal appear when the data signal of 64 Kbits/s is present and absent, respectively. Furthermore, the memorization control section 20 is given a connection state signal CT from an IC/SC type memory 22. The connection state signal CT is representative of a connection relationship between the input and the output channels and specifies whether or not assignment is carried out. If the output channel is connected to the input channel, the output digital signal is transmitted at the bit rate determined for the output channel. Thus, when the input channel is connected to the output channel, assignment is inhibited by the connection state signal given from the IC/SC type memory 22.

As mentioned above, the memorization control section 20 is operable in response to the detection signal DT, the additional request signal AD, and the connection state signal CT.

Referring to FIG. 3 together with FIG. 2, the memorization control section 20 comprises an assignment request generator 25 which is supplied with the detection signal DT, the additional request signal AD, and the connection state signal CT and which may be structured by a read-only memory. This means that such detection, additional request, and connection state signals DT, AD, and CT are sent to the assignment request generator 25 as an address signal which specifies each address of the assignment request generator 25.

Accessed by the above-mentioned signals DT, AD, and CT, the assignment request generator 25 produces a request species signal QUE representative of an assignment request species and a control signal CO representative of temporary memorization of a request in question. Both the request species signal and the control signal CO may be collectively called an assignment request signal which indicates an assignment request. Anyway, the assignment request generator 25 is operable to judge an assignment request and to produce the assignment request signal on the basis of the input signals, such as DT, AD, and CT. It is to be noted here that such request species are classifiable into voice signal assignment, voice band data assignment, 64 kbits/s data assignment, overload channel assignment, and assignment/disconnection, which are given from a lowest degree of priority to a highest degree of priority, respectively.

In the example being illustrated, the request species signal QUE is successively memorized at each input channel number in a request species memory or a queue memory 26 in a time division fashion. Specifically, each request species signal QUE is memorized in relation to every one of the input channel numbers that specifies an address of the request species memory 26. In other words, each input channel number is used as an address signal on memorizing the request species signal QUE.

In addition, the control signal CO is sent to a request buffer memory 27 to be memorized therein. It is noted here that the control signal CO is produced from the assignment request generator 25 when a new assignment request is detected by the assignment request generator 25 and that the control signal CO is representative of the input channel number at which the new assignment request takes place.

Thus, it is necessary to specify each input channel number so as to memorize each request species signal QUE and the control signal CO into the request species memory 26 and the request buffer memory 27. To this end, an internal counter 28 is included in the illustrated memorization control section 20. Specifically, the internal counter 28 successively produces counts to indicate the input channel numbers. For example, when the input channels are equal in number to 256, the internal counter 28 counts clock pulses (not shown) from zero to 255. Each count is sent to a selector 29 and a selector controller 30. The selector 29 has a first input terminal 29a and a second input terminal 29b and is controlled by the selector controller 30. The selector controller 30 supplies the selector 29 with a switching signal to switch the first and the second input terminals 29a and 29b from one to another each time when the internal counter 28 is reset to zero. Thus, the selector 29 supplies the request species memory 26 with the counts as the address signal specifying each address of the request species memory 26. On the other hand, the selector 29 sends the counts to the request buffer memory 27 as the input channel numbers.

Further referring to FIG. 3, the request buffer memory 27 comprises a first stage of a first-in first-out memory (FIFO) 27a connected to the selector 29, a second stage of a first-in first-out memory (FIFO) 27b connected to the first stage of the FIFO 27a, and a memory controller 27c operable in response to the control signal CO to deliver a write-in signal to the first and the second stages of the FIFO's 27a and 27b.

Figure 4:
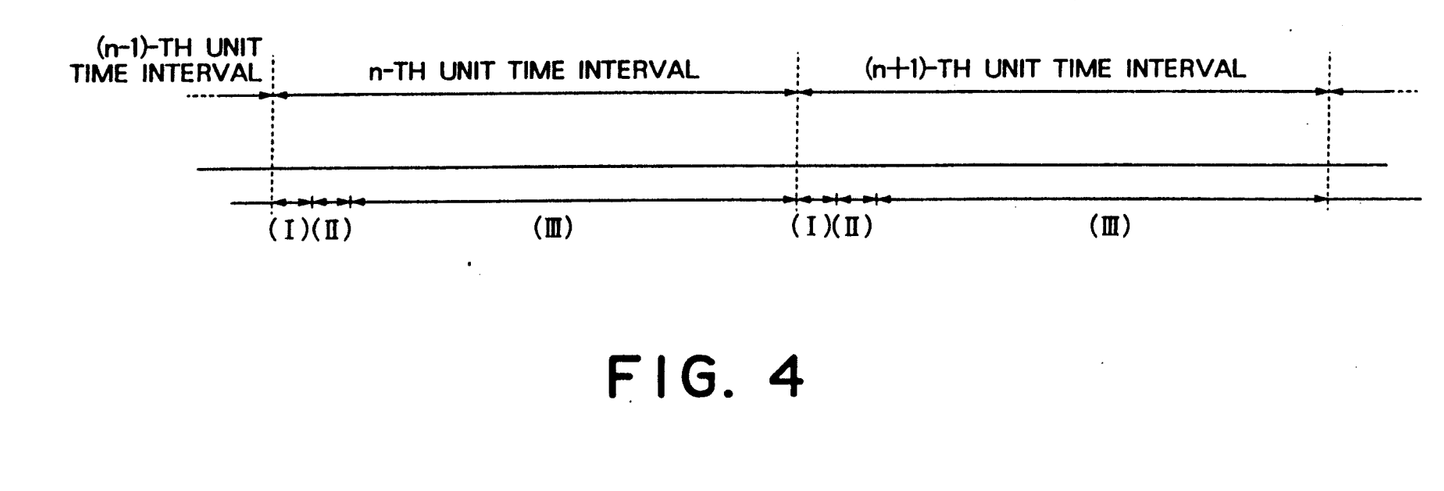
FIG. 4 is a time chart for use in describing operation of the DCME unit illustrated in FIG. 3.

Temporarily referring to FIG. 4 together with FIG. 3, the digital circuit multiplexing equipment unit illustrated in FIGS. 2 and 3 successively carries out processing in a manner to be described later at every one of unit time intervals specified by n-th and (n+1)-th unit time intervals in FIG. 4. In the illustrated example, each unit time interval is divided into first, second, and third frames that are depicted at I, II, and III, respectively. The first frame I of each unit time interval is for generating the assignment request and memorizing the assignment request into the request species memory 26 and the request buffer memory 27 and will be referred to as a request generation and memorization frame.

More particularly, the second stage of the FIFO 27b is cleared or reset by the memory controller 27c at the beginning of the first frame I. Herein, it is mentioned here that the selector 29 selects the second input terminal 29b during the first frame I under control of the selector controller 30. Therefore, the counts of the internal counter 28 are successively sent through the selector 29 to both the request species memory 26 and the first stage of the FIFO 27a of the request buffer memory 27.

Inasmuch as the counts of the internal counter 28 are indicative of each input channel number and delivered as the address signal to the request species memory 26, as mentioned before, the request species memory 26 successively memorizes the request species at the memory addresses indicated by the address signal. Thus, the request species are memorized in the request species memory 26 in relation to all of the input channels during the first frame I.

On the other hand, the control signal CO is produced in synchronism with the input channel numbers given from the assignment request generator 25 each time on occurrence of the new assignment request, as described before. Responsive to the control signal CO, the memory controller 27c supplies the first stage of the FIFO 27a with the write-in signal. Under the circumstances, the first stage of the FIFO 27a is loaded with a new input channel number of a new input channel in which the new assignment request is generated and different from a previous assignment request. As a result, the first stage of the FIFO 27a is loaded with both previously memorized input channel numbers and the new input channel numbers. Under the circumstances, both the previously memorized input channel numbers and the new input channel number are shifted from the first stage of the FIFO 27a to the second stage of the FIFO 27b within the first frame I.

Operation of the first frame I is completed when the internal counter 28 is counted to 255 in the example.

Subsequently, operation proceeds to the second frame II which is for selecting from the request buffer memory 27 a most preferential request that has a highest degree of priority. In this event, the selector 29 selects, under control of the selector controller 30, the first input terminal 29a which is connected to the second stage of the FIFO 27b and a most preferential request latch circuit 31. The memory controller 27c reads out of the second stage of the FIFO 27b the previously memorized and the new input channel numbers. Both the above-mentioned channel numbers will be called readout input channel numbers hereinunder and are sent to the most preferential request latch circuit 31 and to the selector 29. Thus, the readout input channel numbers are memorized into the most preferential request latch circuit 31 on one hand and are sent to the request species memory 26 through the selector 29 as the address signal. As a result, the request species which correspond to the readout input channel numbers are read out of the request species memory 26 and are sent to the most preferential request latch circuit 31.

When the memory controller 27c detects that a low degree of priority is given to a selected input channel specified by a selected one of the readout input channel numbers, such a selected input channel number is returned back to the first stage of the FIFO 27a. Such operation is continued until the second stage of the FIFO 27b becomes empty. It is to be noted that processing is carried out in connection with the selected input channel after the next unit time interval.

During the second frame II, the most preferential request latch circuit 31 selectively latches only a most preferential request that is earliest memorized in the request species memory 26 and the request buffer memory 27 and that is specified by a most preferential species having a highest degree of priority. Thus, the most preferential request is composed of the most preferential request species and the corresponding input channel number. At any rate, the most preferential request species and the corresponding input channel number are sent to an assignment control circuit 33 illustrated in FIG. 2. Thus, a combination of the request species memory 26, the request buffer memory 27, the internal counter 28, the selector controller 30, the selector 29, and the most preferential request latch circuit 31 serves to select the assignment request from a highest degree of priority and may be referred to as a selecting section.

In FIG. 2, the assignment control circuit 33 successively determines assignment of the input channels to the output channels with reference to the request species during the third frame III. In addition, the assignment control circuit 33 supplies an ADPCM encoder 35 and the high speed switching circuit 14 with first and second assignment control signals, respectively. Furthermore, the illustrated assignment control circuit 33 supplies the IC/SC type memory 22 with a third assignment control signal as the connection state signal CT. On the other hand, each assignment control signal is sent to an assignment signal encoder 18' to be encoded into an encoded assignment signal.

With this structure, the first assignment control signal serves to determine whether or not encoding is carried out in the ADPCM encoder and to determine the bit rates in the ADPCM encoder 35 when the voice signal and the voice band signal are given to the DCME unit. In this sense, the first assignment control signal may be called an encoding control signal. On the other hand, the second assignment control signal serves to indicate the output channels and to assign output signals of the ADPCM encoder 35 to the corresponding output channels. As a result, output digital signals are produced from the high speed switching circuit 14 during the third frame III with the output channels assigned thereto and are sent to a transmission line together with the encoded assignment signal. Accordingly, the third frame III may be called an assignment control frame. The assignment control circuit 33 may be called a bit rate determining circuit because it serves to determine the bit rates in the ADPCM encoder.

After the most preferential request is assigned or processed by the assignment control circuit 33 in FIGS. 2 and 3, the most preferential request should be removed from the request species memory 26 and the request buffer memory 27. However, it is actually difficult to remove the most preferential request from the request species memory 26 and the request buffer memory 27.

In addition, no assignment is necessary when a difference takes place between previous and current assignment requests because the previous assignment is abandoned. Under the circumstances, the previous assignment request may be drawn out from the request species memory 26 and the request buffer memory 27. On drawing out such a previous assignment request, the input channel numbers must not be changed. It is difficult to carry out the above-mentioned operation in the DCME unit illustrated in FIGS. 2 and 3.

Figure 5:
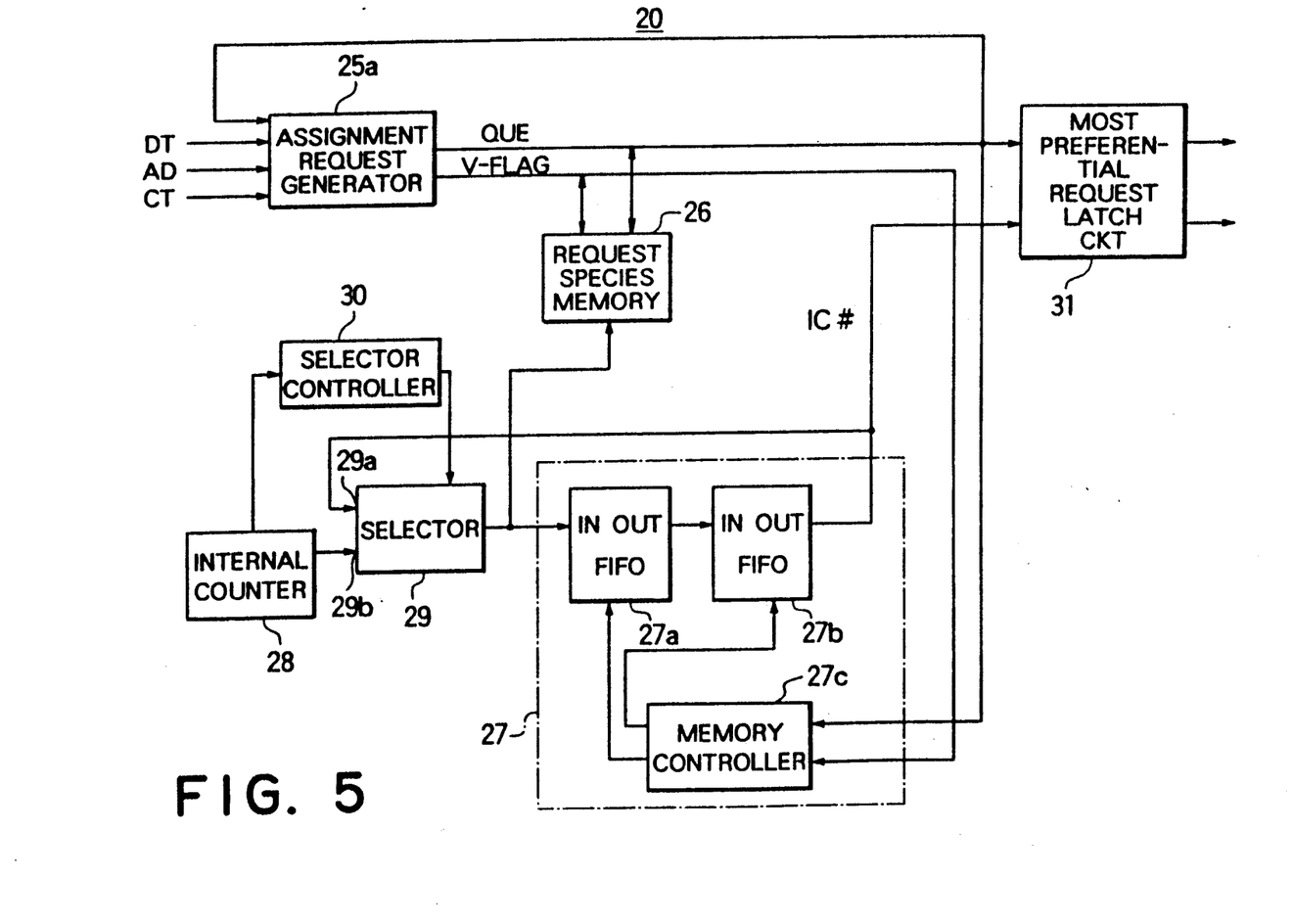
FIG. 5 is a block diagram of a part of the DCME unit according to the second embodiment of this invention.
Figure 6:
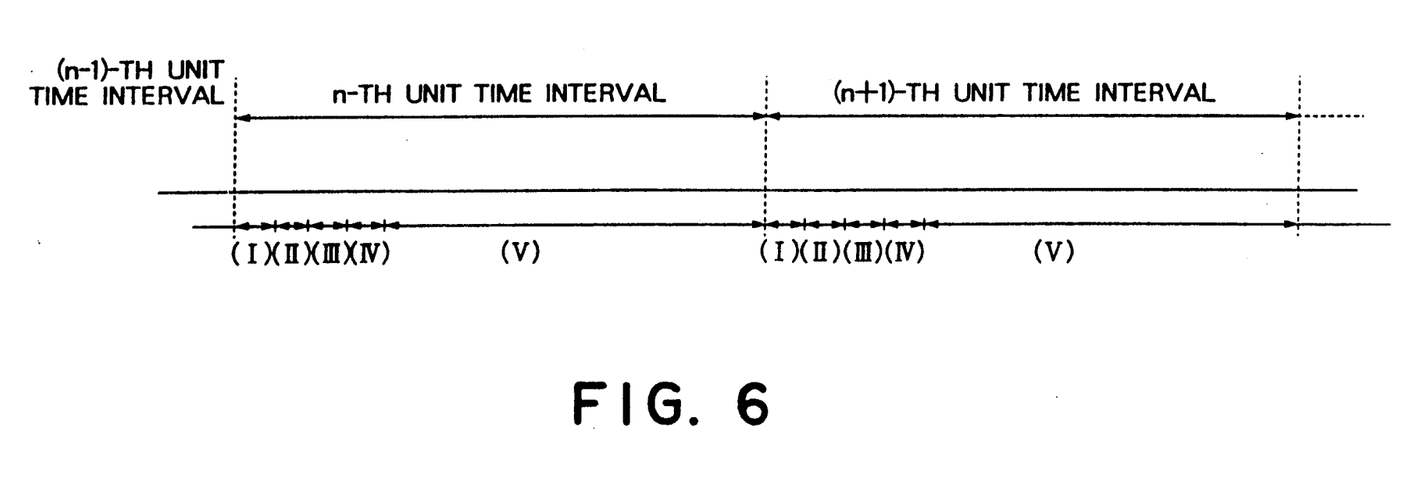
FIG. 6 is a time chart for use in describing operation of the DCME unit illustrated in FIG. 5.

Referring to FIGS. 5 and 6 together with FIG. 2, a digital circuit multiplexing equipment unit according to a second embodiment of this invention is similar in structure to that illustrated in FIGS. 2 and 3 except that a memorization control circuit 20 is somewhat different from that illustrated in FIG. 3, as shown in FIG. 5. Therefore, only the memorization control section 20 of FIG. 5 will be mainly described hereinunder and carries out processing within each of unit time intervals which are exemplified by (n−1)-th, n-th, and (n+1)-th unit time intervals in FIG. 6. Each of the unit time intervals is divisible into first through fifth frames I to IV. The illustrated memorization control section 20 comprises an assignment request generator 25a which is supplied in addition to the detection signal DT, the additional request signal AD, and the connection state signal CT, with a previous request species signal QUE produced during a previous unit time interval, for example, the (n−1)-th unit time interval, as shown in FIG. 6. The previous request species signal QUE is successively read out of the request species memory 26 to be sent to the assignment request generator 25a.

Under the circumstances, the illustrated assignment request generator 25a generates a current request species signal QUE with reference to the detection signal DT, the additional request signal AD, and the connection state signal CT in the manner mentioned in conjunction with FIG. 3 and compares the current request species signal QUE with the previous request species signal to produce a control flag (will be called a V-flag) which is representative of whether or not the current request species signal QUE is identical or coincident with the previous request species signal. The V-flag is successively memorized into the request species memory 26 together with the current request species signal QUE in synchronism with the input channel number indicated by the internal counter 28 in the manner described with reference to FIG. 3. Such memorization of the V-flag and the current request species signal QUE is successively carried out about every one of the input channels within the first frame I illustrated in FIG. 6. In this event, the selector 29 selects the second input terminal 29b under control of the selector controller 30 within the first frame I to allow the counts of the internal counter 28 to pass therethrough and to supply the counts to the request species memory 26 as an address signal. As a result, the current request species signal QUE and the V-flag are memorized in the request species memory 26 in accordance with the address signal. Accordingly, the first frame I may be called a memorization frame.

It is mentioned here that the first stage of the FIFO 27a is loaded with previous input channel numbers which are obtained during the previous unit time interval. During the first frame I of the current or following unit time interval, previous input channel numbers of the first stage of the FIFO 27a are successively shifted to the second stage of the FIFO 27b. Thus, the second stage of the FIFO 27b memorizes the previous input channel numbers when the first frame I is finished.

During the second frame II, the selector 29 selects the second input terminal 29a under control of the selector controller 30 while the memory controller 27c accesses the second stage of the FIFO 27b to read the previous input channel numbers out of the second stage of the FIFO 27b. The previous input channel numbers read out of the FIFO 27b pass through the selector 29 to be sent to the request species memory 26 as the address signal. As a result, the V-flag is successively read out of the request species memory 26 and delivered to the memory controller 27c.

Supplied with the V-flag, the memory controller 27c judges whether or not the previous request species is identical with the current request species at each input channel. Thereafter, the memory controller 27c determines whether or not each previous input channel number is to be shifted from the second stage of the FIFO 27b to the first stage of the FIFO 27a.

Practically, if the V-flag represents that the previous request species is identical with the current request species and the current request in each input channel is present, the illustrated memory controller 27c controls the first and the second stages of the FIFO's 27a and 27b so that the previous input channel number which corresponds to the V-flag in question is shifted to the first stage of the FIFO 27a. Otherwise, the previous input channel number in question is not written into the first stage of the FIFO 27a. This shows that the previous input channel number is drawn out or withdrawn from the request buffer memory 27 on occurrence of incoincidence between the previous and the current request species. This is because the previous assignment request is different from the current request or is already extinct and that different or no assignment is necessary in such a current assignment request. Such operation is carried out in connection with every one of the previous input channel numbers memorized in the second stage of the FIFO 27b.

Thus, it is possible with this structure to withdraw previous input channel numbers alone to be withdrawn, with an occurrence order or a sequential order of the previous input channel number kept unchanged. As mentioned before, the second frame II serves to rearrange contents of the FIFO's 27a and 27b and may be referred to as a memory rearranging frame.

After the second frame II, processing proceeds to the third frame III during which the selector 29 selects the second input terminal 29b to allow the counts of the internal counter 28 to pass therethrough. Consequently, the counts of the internal counter 28 are successively delivered as the address signal to the request species memory 26 in which the current request species signal QUE and the V-flag are memorized at every one of the input channels, as mentioned in conjunction with the first frame I. Supplied with the address signal, the current request species signal QUE and the corresponding V-flag are successively read out of the request species memory 26 to be sent to the memory controller 27c. The memory controller 27c supplies the first stage of the FIFO 27a with a write-in signal only when the V-flag is representative of the incoincidence between the current and the previous assignment requests and the current assignment request is present. Inasmuch as the first stage of the FIFO 27a is given the counts of the internal counter 28 as input channel numbers during the third frame III, the input channel number is written into the first stage of the FIFO 27a only when the write-in signal is supplied to the first stage of the FIFO 27a. In other words, the input channel numbers are memorized into the first stage of the FIFO 27a only when the current request is changed from the previous assignment request. Thus, the input channel numbers of the current assignment requests changed from the previous assignment requests are added to the contents of the first stage of the FIFO 27a.

Simultaneously, the input channel numbers memorized in the first stage of the FIFO 27a are transferred to the second stage of the FIFO 27b to be stored therein.

The third frame III is followed by the fourth frame IV in which the selector 29 selects the first input terminal 29a while the memory controller 27c read the input channel numbers out of the second stage of the FIFO 27b. In this situation, the input channel numbers are sent to the most preferential request latch circuit 31 and to the request species memory 26 through the selector 29 as the address signal. As a result, the request species signal QUE memorized in the third frame III is successively read out of the request species memory 26 in one-to-one correspondence to each input channel number and is supplied to both the most preferential request latch circuit 31 and the memory controller 27c.

When the memory controller 27c judges that the request species signal QUE read out of the request species memory 26 is low in a degree of priority, the assignment request in question is processed in the following unit time interval. To this end, the input channel number of the low priority request is fed back to the first stage of the FIFO 27a. Such operation is continued until the input channel numbers are empty in the second stage of the FIFO 27b.

During the fourth frame IV, the most preferential request latch circuit 31 produces a most preferential assignment request by selecting a most preferential request species and an earliest memorized assignment request from the request species signal QUE and the input channel number that are successively supplied from the assignment request generator 25a and the request buffer memory 27. From this fact, it is readily understood that the most preferential assignment request is composed of a most preferential request species and the corresponding input channel number. At any rate, the fourth frame serves to select a most preferential assignment request and may be called a most preferential request selection frame.

The most preferential request is sent to the assignment control circuit 33 (FIG. 2) and processed during the fifth frame V (FIG. 6) in the manner described in conjunction with FIG. 2. Therefore, description will be omitted about operation of the assignment control circuit 33. Anyway, the fifth frame V serves to assign the output channels and may be referred to as an assignment control frame.

Figure 7:
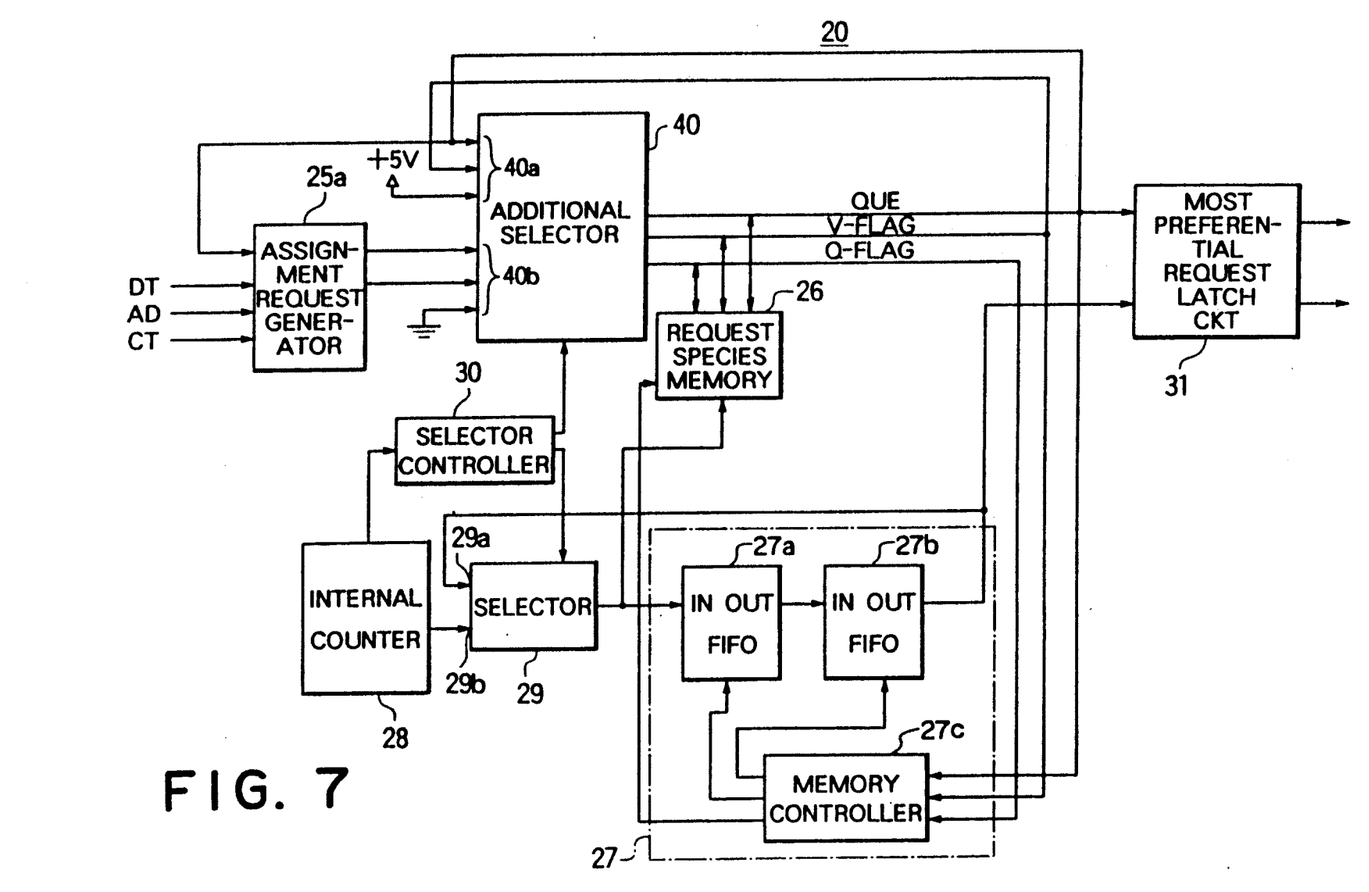
FIG. 7 is a block diagram of a part of the DCME unit according to the third embodiment of this invention.

Referring to FIG. 7 together with FIG. 6, a digital circuit multiplexing equipment unit according to a third embodiment of this invention processes assignment requests in a sequence of unit time intervals each of which is divisible into the first through the fifth frames I to V illustrated in FIG. 6. In addition, the digital circuit multiplexing equipment unit is similar in structure to that illustrated in FIG. 5 except that an additional selector 40 is included in FIG. 7 to produce an additional flag which may be called a Q-flag and which is delivered to the memory controller 27c and that the memory controller 27c also controls the request species memory 26. More specifically, the additional selector 40 has a first set of terminals 40a and a second set of terminals 40b connected to an assignment request generator 25a similar in structure and operation to that illustrated in FIG. 5. Two of the first-set terminals 40a are connected to the request species memory 26 to receive the request species signal QUE and the V-flag from the request species memory 26, as mentioned in FIG. 5, while the remaining one of the first-set terminals 40a is given a d.c. voltage of 5 volts to produce a logic "1" level signal. On the other hand, two of the second-set terminals 40b are connected to the assignment request generator 25a to receive the request species signal QUE and the V-flag while the remaining one of the second-set terminals 40b is grounded to give a logic "0" level signal. The additional selector 40 switches the first-and the second-set terminals 40a and 40b from one to another under control of the selector controller 30.

With this structure, it is possible to avoid double registration of an input channel number to the first stage of the FIFO 27a by the use of the Q-flag, as will become clear.

During the first frame I, the selector 29 selects the second input terminal 29b to allow the counts of the internal counter 28 to pass therethrough. The counts of the internal counter 28 are successively sent through the selector 29 to the request species memory 26 as the address signal. Responsive to the address signal, the request species memory 26 successively produces a previous request species signal QUE which is memorized during a previous unit time interval and which is delivered to the assignment request generator 25a. The assignment request generator 25a changes the previous request species signal QUE to a renewed request species signal with reference to the detection signal DT, the additional request signal AD, the connection state signal CT, and the previous request species signal QUE. In this event, the assignment request generator 25a judges whether or not the previous request species signal QUE is identical with the renewed request species signal to produce the V-flag like in FIG. 5. The renewed request species signal and the V-flag are sent to the additional selector 40 together with the logic "0" level signal which is produced as the Q-flag. Inasmuch as the additional selector 40 selects the second input terminals 29b during the first frame I, the renewed request species signal, the V-flag, and the Q-flag of the logic "0" level are sent through the additional selector 40 to the request species memory 26 to be memorized therein.

The above-mentioned operation is successively carried out in conjunction with each of the input channels during the first frame I. In addition, previous input channel numbers are memorized in the first stage of the FIFO 27a during a previous unit time interval before a current unit time interval. The memory controller 27c controls the first and the second stages of the FIFO's 27a and 27b to shift the previous input channel numbers from the first stage of the FIFO 27a to the second stage of the FIFO 27b.

During the second frame II, the selector 29 selects the first input terminal 29a under control of the selector controller 30. The memory controller 27c accesses the second stage of the FIFO 27b to successively read the previous input channel numbers out of the second stage of the FIFO 27b.

On the other hand, the previous input channel numbers are sent through the selector 29 to the request species memory 26 as the address signal. The previous request species signal, the V-flag, and the Q-flag are read out of the request species memory 26 to be sent to the memory controller 27c. Supplied with the previous request species signal, the V-flag, and the Q-flag, the memory controller 27c determines whether or not each input channel number is transferred from the second stage of the FIFO 27b to the first stage of the FIFO 27a on the basis of the previous request species signal, the V-flag, and the Q-flag. Specifically, it is assumed that the current request species signal is identical with the previous request species signal and is to be memorized and that the Q-flag takes the logic "0" level. In this case, the input channel number in question is memorized into the first stage of the FIFO 27a under control of the memory controller 27c.

On the other hand, if the above-mentioned conditions are not satisfied, the input channel number in question is read out of the second stage of the FIFO 27b but is not transferred to the first stage of the FIFO. This shows that a useless input channel number is drawn out from the request buffer memory 27.

During the second frame II, the additional selector 40 selects the first-set terminals 40a. The request species memory 26 is given the address signal specified by the input channel numbers stored in the first stage of the FIFO 27a, as mentioned before. Consequently, the request species signal for each of the input channel numbers stored in the first stage of the FIFO 27a and the V-flag are written into the request species memory 26. In addition, the Q-flag of the logic "1" level is written into the request species memory 26. such write-in operation is carried out in conjunction with each of the input channel numbers stored in the request species memory 26.

The write-in operation makes it possible to draw out the useless input channel number with the time sequence or order of occurrence of assignment requests kept unchanged. Besides, once each of the input channel numbers is transferred to the first stage of the FIFO 27a with reference to the Q-flag, such an input channel number is never written into the first stage of the FIFO 27a again during the second frame II. This means that double registration of the input channel number can be avoided in the first stage of the FIFO 27a.

Subsequently, the second input terminal 29b is selected in the selector 29 under control of the selector controller 30 during the third frame III. As a result, the counts of the internal counter 28 are sent through the selector 29 to the request species memory 26 as the address signal. Responsive to the address signal, the request species memory 26 successively produces the memorized request species and the corresponding V-flag which are sent to the memory controller 27c. When the memorized request species signal is representative of a species to be memorized and the corresponding input channel number is not registered in the first stage of the FIFO 27a, the input channel in question is memorized into the first stage of the FIFO 27a under control of the memory controller 27c. Simultaneously, the memory controller 27c controls the first and the second stage of the FIFO's 27a and 27b so that all of the input channel numbers memorized in the first stage of the FIFO 27a are transferred to the second stage of the FIFO 27b.

During the fourth frame IV, the selector 29 selects the first input terminal 29a under control of the selector controller 30. As a result, memorized input channel numbers are successively read out of the second stage of the FIFO 27b as readout input channel numbers. The readout input channel numbers are delivered to the most preferential request latch circuit 31 on one hand and to the request species memory 26 as the address signal on the other hand. The request species memory 26 supplies the most preferential request latch circuit 31 with the request species signal corresponding to the readout input channel number. When the readout input channel number is low in a degree of priority, processing should be carried out about such a low priority input channel number during the next following unit time interval. Accordingly, the low priority input channel number is returned back to the first stage of the FIFO 27a. Similar operation is continued until the second stage of the FIFO 27b becomes empty.

During the fourth frame IV, the most preferential request latch circuit 31 selectively latches a most preferential request species and an earliest memorized assignment request to supply them to the assignment control circuit 33 (FIG. 2). Thereafter, operation is carried out during the fifth frame V in the manner described in conjunction with FIG. 2.

As is apparent from the above, the digital circuit multiplexing equipment unit according to this invention readily copes with an increase of species of the request without increasing a capacity of the memories 26 and 27 or the number of such memories. This shows that an amount of hardware can be reduced. Use of the most preferential request latch circuit 31 enables a reduction of a load imposed on the assignment control circuit 33.

While this invention has thus far been described in conjunction with a few embodiments thereof, it will readily be possible for those skilled in the art to put this invention into practice in various other manners.

What is claimed is:

1. A digital circuit multiplexing equipment unit which receives a plurality of input signals in a respective plurality of input channels, each input channel being given an input channel number, and which assigns the input signals to a plurality of output channels after being encoded at selected bit rates, said unit comprising:

detecting means responsive to said input signals for detecting whether each of said input signals is present in its respective input channel, to thus produce a channel state signal;

request producing means responsive to said channel state signal for producing assignment request sequentially appearing with time, said assignment requests each corresponding to a respective input signal and each indicating a respective degree of priority of its respective input signal amongst all of the input signals;

selecting means for selecting said assignment requests in the sequential order according to the respective degree of priority of said input signals;

bit rate determining means responsive to the selected assignment request for determining said bit rates to be used in said output channels; and multiplexing means for connecting the input signals to the output channels in accordance with the selected assignment requests selected by said selecting means;

wherein each of said assignment requests being specified by a time sequence of occurrence of the assignment request and including the input channel number of the input channel in which the assignment request occurs and a request species indicative of the particular type of input signal corresponding to the assignment request;

said selecting means comprising:

priority deciding means (26-30) for deciding the degree of priority on the basis of said request species and said time sequence of the occurrence of the assignment request; and selected request producing means (31) for producing, as said selected request, the input channel number and said request species;

said priority deciding means comprising:

first memory means (27) for memorizing the input channel number and the time sequence;

second memory means (26) for memorizing the request species; and preferential request selection means (28-30) for selecting a higher degree of priority by monitoring said first and said second memory means.

2. A digital circuit multiplexing equipment unit as claimed in claim 1, wherein said request producing means comprises:
   means for producing a first flag representative of whether or not a request species of a current assignment request is identical with a request species of a previous assignment request and for storing said first flag in said second memory; and
   control means for controlling a write-in operation of said first memory means in response to said first flag.

3. A digital circuit multiplexing equipment unit as claimed in claim 2, wherein said first memory means comprises:
   primary and subsidiary first-in first-out memories;
   loading means for loading said subsidiary first-in first-out memory with the input channel number of said previous assignment request;
   said control means transferring the input channel number to said primary first-in first-out memory from said subsidiary first-in first-out memory on the basis of said first flag.

4. A digital circuit multiplexing equipment unit as claimed in claim 3, wherein said selecting means (20) further comprises:
   means for producing a second flag (O-flag) at regular predetermined time intervals, an assignment request being produced during each time interval; and
   means for preventing the input channel number from being transferred into said primary first-in first-out memory when said second flag is turned on.

5. A digital circuit multiplexing equipment unit which receives a plurality of input signals in a respective plurality of input channels, each input channel being given an input channel number, and assigns the input signals to a plurality of output channels after being encoded at selected bit rates, said unit comprising:
   detecting means (13) responsive to said input signals for detecting whether each of said input signals is present in its respective input channel, to thus produce a channel state signal;
   request producing means (25a) responsive to said channel state signals for producing, an assignment request, request species sequentially appearing with time together with control flags (V-flag) representative of whether or not a current one of the request species is identical with a previous one of said request species, said assignment request each corresponding to a respective input signal and each specifying a respective degree of priority of its respective input signal amongst all of the input signals, said request species being indicative of a type of one of said input digital signals that is supplied to said detecting means and in which the assignment request occurs;
   selecting means (26-31) for selecting said assignment requests in the sequential order according to the respective degree of priority of said input signals;
   bit rate determining means (33,35,14) responsive to the selected assignment requests for determining said bit rates to be used in said output channels;
   said assignment request being also specified by a time sequence of occurrence of the assignment request and further comprising one of said channel numbers as an input channel number in which the assignment request occurs;
   said selecting means comprising:
   channel number producing means (28, 29) for successively producing an address signal;
   assignment request memory means (26), having a plurality of addresses corresponding to the input channel number, for successively memorizing said request species and the corresponding control flags in accordance with the address signal;
   priority deciding means (27, 31) for deciding the degree of priority on the basis of said request species and said time sequence of the occurrence of the assignment request by removing a previous one of the input channel numbers on detection of incoincidence between a current one and a previous one of the request species to produce the control flag and by shifting the input channel numbers one by one after removal of the previous one of the input channel numbers; and
   selected request producing means for producing, as said selected request, the input channel number and said request species.

6. A digital circuit multiplexing equipment unit as claimed in claim 5, wherein said request producing means comprises:
   means for producing a first control flag representative of whether or not a request species of a current assignment request is identical with a request species of a previous assignment request and for storing said first control flag in said assignment request memory.

7. A digital circuit multiplexing equipment unit as claimed in claim 6, wherein said priority deciding means include first memory means which includes:
   primary and subsidiary first-in first-out memories;
   loading means for loading said subsidiary first-in first-out memory with the input channel number of said previous assignment request; and
   said request producing means further comprises:
   control means for controlling a write-in operation of said first memory means in response to said first control flag,
   said control means transferring the input channel number to said primary first-in first-out memory from said subsidiary first-in first-out memory on the basis of said first control flag.

8. A digital circuit multiplexing equipment unit as claimed in claim 7, wherein said selecting means further comprises:
   means for using a second control flag representative of whether or not the input channel number is transferred to said primary first-in first-out memory from said subsidiary first-in first-out memory;
   means for turning on said second flag when the input channel number is transferred to said primary first-in first-out memory once; and
   means for preventing the input channel number from being transferred into said primary first-in first-out memory when said second flag is turned on.

9. A digital circuit multiplexing equipment unit which receives a plurality of input signals in a respective plurality of input channels, each input channel having an input channel number, and assigns the input signals to a plurality of output channels after being encoded at selected bit rates, said unit comprising:
   detecting means responsive to said input signals for detecting whether each of said input signals is present in its respective input channel, to thus produce a channel state signal;

request producing means responsive to said channel state signal for producing assignment requests sequentially appearing with time said assignment requests each corresponding to a respective input signal and each indicating a respective degree of priority of its respective input signal amongst all of the input signals;

selecting means for selecting said assignment requests in the sequential order according to the respective degree of priority of said input signals;

bit rate determining means responsive to the selected assignment requests for determining said bit rates to be used in said output channels; and multiplexing means for connecting the input signals to the output channels in accordance with the selected assignment requests selected by said selecting means;

wherein each of said assignment requests includes the input channel number of the input channel in which the assignment request occurs, a time sequence of occurrence of the assignment request, and a request species indicative of the particular type of input signal corresponding to the assignment request;

said selecting means comprising:

priority deciding means for deciding the degree of priority on the basis of said request species and said time sequence of the occurrence of the assignment request; and selected request producing means for producing, as said selected request, the input channel number and said request species;

wherein said priority deciding means comprises:

first memory means for memorizing the input channel number and the time sequence;

second memory means for memorizing the request species; and preferential request selection means for selecting a higher degree of priority by monitoring said first and said second memory means;

wherein said request producing means comprises:

means for producing a first flag representative of whether or not a request species of a current assignment request is identical with a request species of a previous assignment request and for storing said first flag in said second memory; and control means for controlling a write-in operation of said first memory means in response to said first flag.

10. A digital circuit multiplexing equipment unit as claimed in claim 9, wherein said first memory means comprises:

primary and subsidiary first-in first-out memories;

loading means for loading said subsidiary first-in first-out memory with the input channel number of said previous assignment request;

said control means transferring the input channel number to said primary first-in first-out memory from said subsidiary first-in first-out memory on the basis of said first flag.

11. A digital circuit multiplexing equipment unit as claimed in claim 10, wherein said selecting means further comprises:

means for using a second control flag representative of whether or not the input channel number is transferred to said primary first-in first-out memory from said subsidiary first-in first-out memory;

means for turning on said second flag when the input channel number is transferred to said primary first-in first-out memory once; and means for preventing the input channel number from being transferred into said primary first-in first-out memory when said second flag is turned on.

* * * * *

UNITED STATES PATENT AND TRADEMARK OFFICE
CERTIFICATE OF CORRECTION

PATENT NO. : 5,257,262
DATED : October 26, 1993
INVENTOR(S) : Masashi SHIOKA et al.

It is certified that error appears in the above-identified patent and that said Letters Patent is hereby corrected as shown below:

Col. 15, line 26, delete "O" and insert --Q--.

Signed and Sealed this

Ninth Day of August, 1994

Attest:

Attesting Officer

BRUCE LEHMAN

Commissioner of Patents and Trademarks